United States Patent [19]
Kawakami

[11] Patent Number: 5,693,105
[45] Date of Patent: Dec. 2, 1997

[54] BATTERY AND ITS FABRICATION METHOD

[75] Inventor: Soichiro Kawakami, Nara, Japan

[73] Assignee: Canon Kabushiki Kaisha, Tokyo, Japan

[21] Appl. No.: 654,381

[22] Filed: May 28, 1996

Related U.S. Application Data

[62] Division of Ser. No. 416,527, Apr. 3, 1995, Pat. No. 5,582,931, which is a continuation of Ser. No. 167,139, Dec. 16, 1993, abandoned.

[30] Foreign Application Priority Data

Dec. 18, 1992 [JP] Japan ................. 4-338806

[51] Int. Cl.$^6$ .................................................. H01M 10/38
[52] U.S. Cl. .................................. 29/623.2; 429/192
[58] Field of Search .......................... 29/623.2; 429/192, 429/124, 162

[56] References Cited

U.S. PATENT DOCUMENTS

| | | | |
|---|---|---|---|
| 3,006,980 | 10/1961 | Story | 136/6 |
| 3,230,115 | 1/1966 | Tamminen | 136/111 |
| 3,313,657 | 4/1967 | Wood | 136/90 |
| 3,607,430 | 9/1971 | Glover | 29/623.2 |
| 3,701,690 | 10/1972 | Dermody et al. | 136/175 |
| 5,089,027 | 2/1992 | Rossoll et al. | 29/623.2 |
| 5,618,318 | 4/1997 | Reddy et al. | 429/192 X |

FOREIGN PATENT DOCUMENTS

| | | |
|---|---|---|
| 0025663 | 3/1981 | European Pat. Off. |
| 0533576 | 3/1993 | European Pat. Off. |
| 2544134 | 10/1984 | France |
| 330260 | 2/1991 | Japan |
| 1078135 | 8/1967 | United Kingdom |
| 2060983 | 5/1981 | United Kingdom |
| WO9120105 | 12/1991 | WIPO |

*Primary Examiner*—John S. Maples
*Attorney, Agent, or Firm*—Fitzpatrick, Cella, Harper & Scinto

[57] ABSTRACT

An object of the present invention is to provide a rectangular or sheet-like cell being capable of supplying the flow of a large current, and having a large energy density per volume, at least comprising a negative electrode active material, a separator, a positive electrode active material, an electrolyte, and a collector, characterized in that positive electrodes made of positive electrode active material and negative electrodes made of negative electrode active material are formed in a plurality of regions separated from each other at least on a foldable insulating member, and the cell is housed being folded up in a resin having no active material. According to the present invention, a rectangular cell can be fabricated which can attain an energy density equivalent to that of spirally wound cylindrical cell, and supply the flow of a large current, with the dead space of cell storage space reduced to the utmost. Further, since the integration can be effected even with a single cell, a sheet-type or rectangular cell having a higher cell voltage can be made. Also, the manufacturing process of cells can be simplified.

6 Claims, 11 Drawing Sheets

BATTERY AND ITS FABRICATION METHOD

This application is a division of application Ser. No. 08/416,527, filed Apr. 3, 1995, now U.S. Pat. No. 5,582,931 which is a continuation of application Ser. No. 08/167,139, filed on Dec. 16, 1993, now abandoned.

BACKGROUND OF THE INVENTION

1. Field of the Invention

The present invention relates to a rectangular and sheet-like cell, and particularly to the structure of a rectangular and sheet-like cell of high capacity type or integration type and its fabrication method.

2. Related Background Art

With the advancement of the electronics, there have been spread headphone stereos, compact disk players, compact cameras, video cameras, book-type personal computers, which involve the use of primary or secondary cells. Most of the cells employed are of cylindrical type. Cylindrical cells have a large dead space which is an unused portion within a cell box for accommodation, and recently, rectangular cells with less dead space to permit the effective use of the space have appeared. However, in the state of the art, cylindrical cells of spirally wound structure are able to have a larger plate area to supply a larger current flow, and have a higher energy density to attain superior performance, as compared with rectangular cells. Further, spirally wound cylindrical cells are easier to manufacture than rectangular cells. Therefore, there is a need for developing rectangular cells which are capable of supplying a large current flow, have a high energy density, and are easy to manufacture.

FIG. 10 is a schematic view of a spirally wound cylindrical cell, shown partly in cross section. FIG. 11A is a schematic view of a rectangular cell housed within a cell case, and FIG. 11B is a schematic constitutional view of a conventional rectangular cell. In FIG. 10, 901 is a positive electrode sheet made of positive electrode active material, 902 is a collector lead, 903 is a negative electrode sheet made of negative electrode active material. Reference numeral 904 is a collector, 905 is a separator holding an electrolyte, 906 is a cell case (negative electrode can), 907 is a positive electrode cap, 908 is an insulating gasket, 909 is an insulating plate, and 910 is an insulator or separator. This spirally wound cylindrical cell is constituted by packing the positive electrode sheet 901, the separator 905 and the negative electrode sheet 903, in a sandwiched and wound structure, within the cell case 906, connecting thereto a lead extended from the collector, adding an electrolyte thereto, and putting the positive electrode cap 907 thereon. In FIGS. 11A and 11B, 1001 is a positive plate made of positive electrode active material, 1002 is a collector, 1003 is a negative plate made of negative electrode active material, 1004 is a collector, 1005 is a separator holding an electrolyte, 1006 is a cell case (negative electrode can), 1007 is a positive electrode terminal, 1008 is an insulating gasket, 1009 is a cap, and 1010 is a collector lead. Within the rectangular cell, the positive plate 1001 and the negative plate 1003 are laminated with the separator 1005 therebetween, as shown in FIG. 11B.

From an external shape of the cell as shown in FIG. 10 and FIG. 11A, it can be seen that the rectangular cell will occupy only a slightly smaller dead space when accommodated within the device than that of the spirally wound cylindrical cell. However, from the comparison between the structures of FIG. 10 and FIGS. 11A and 11B, it can be seen that the spirally wound cylindrical cell can have a larger plate area, and a greater bulk density per volume of cell main body than the rectangular cell. Therefore, the conventional rectangular cell can have only a smaller plate area than the spirally wound cylindrical cell, and thus is difficult to pass as high a current flow as the spirally wound cylindrical cell, resulting in a substantial low energy density. Also, in the manufacturing process, the rectangular cell has a problem that it is involved in more manufacturing processes, and more complicated than the spirally wound cylindrical cell, because the rectangular cell involves the lamination of a plurality of positive and negative plates and the connection of a plurality of collector leads while the spirally wound cylindrical cell is made by the continuous lamination of positive electrode and negative electrode.

SUMMARY OF THE INVENTION

The present invention has been achieved to solve the above-mentioned conventional problem, and its objective is to provide a rectangular cell or sheet-like cell, which is able to supply a large current flow, has a great energy density per volume, and is simple to manufacture, the rectangular cell or sheet-like cell at least comprising a negative electrode active material, a separator, a positive electrode active material, an electrolyte, and a collector, characterized in that a positive electrode made of positive electrode active material and a negative electrode made of negative electrode active material are formed in a plurality of regions separated from each other at least on an insulating member (hereinafter also referred to as an insulating substrate). Also, the present invention includes a cell fabrication method in which a positive electrode active material and a negative electrode active material are formed in a plurality of regions separated from each other on the insulating member, which are then folded on the regions having no positive and negative electrode active materials. Further, the present invention includes a cell characterized in that a bendable (foldable) flexible material is used for the insulating substrate to fold regions having no active material and accommodate the cell within the cell case. The present invention is particularly effective for secondary cells which can be charged in short time, because of the possibility of employing a thin plate, providing a larger plate area and supplying a larger current flow. Further, the present invention allows for easy serialization of unit cells, and easy fabrication of high voltage type cells.

DETAILED DESCRIPTION OF THE PREFERRED EMBODIMENTS

Figure 1A:
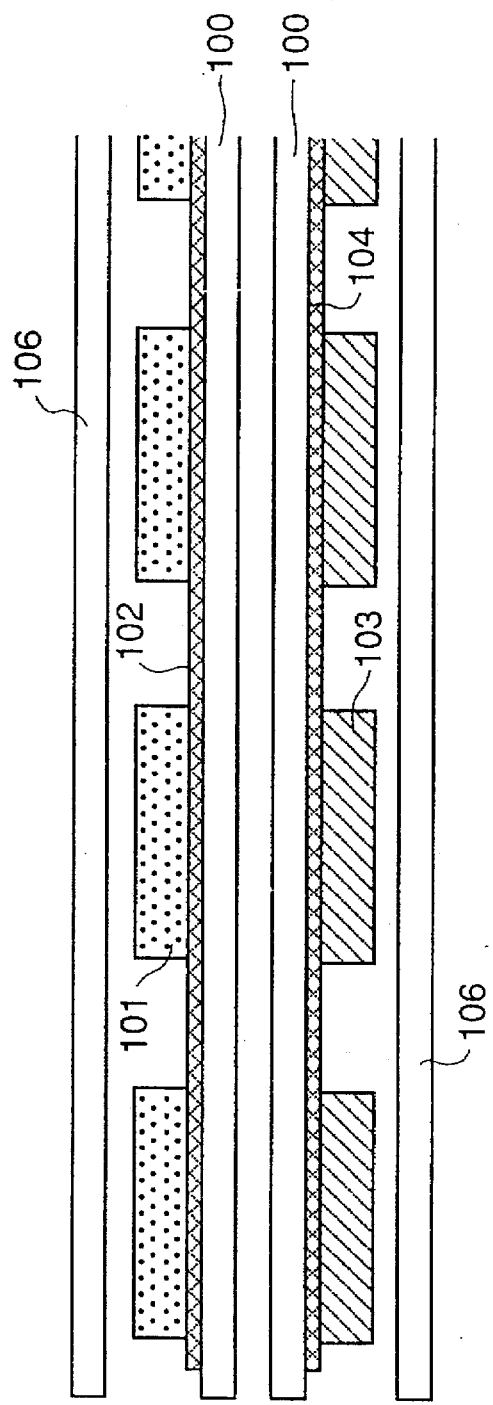
FIGS. 1A and 1B are typical views for explaining the present invention.

FIGS. 1A to 4 are views for explaining the present invention. FIGS. 1A and 1B show positive electrodes and negative electrodes in a plurality of regions formed on a sheet-like insulating substrate before folding. FIG. 1A is a parallel connection type in which pairs of positive electrodes and negative electrodes are connected in parallel via collectors. Fig. 1B is a serial connection type of unit cells in which pairs of positive electrodes and negative electrodes are connected serially via collectors to enhance the cell voltage. In FIGS. 1A and 1B, 100 is a sheet-like insulating member, 101 is a positive electrode, 102 and 104 are collectors, 103 is a negative electrode, and 106 is a protective sheet. The insulating member 100 may be also used as the separator. For the protective sheet 100, a material of the separator may be used.

In FIG. 1A, electrodes to be paired are provided on respective insulating members, but may be provided on the same insulating member. In such a case, it is necessary that the material of insulating member has fine ports, which allow the insulating material to fulfill a function of the separator.

The collectors 102 and 104 each may be provided between the insulating member and the positive or negative electrode, or on or in the positive or negative electrode.

Figure 1B:
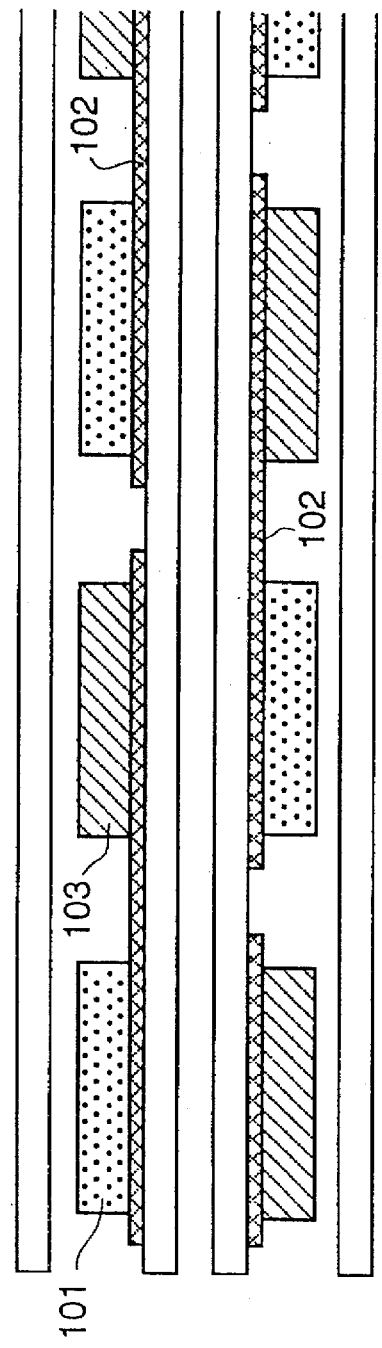

In FIG. 1B, with a constitution as shown, a sheet-type cell of the high voltage type can be readily fabricated. Thereby, the fabrication of a thin sheet cell of the high voltage type is allowed.

Figure 11A:
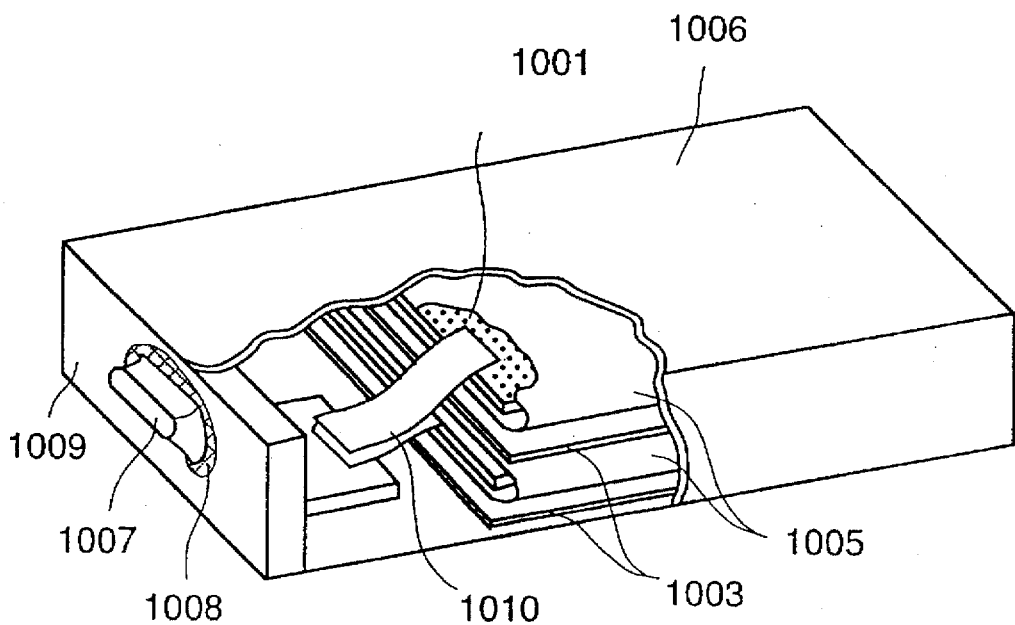
FIGS. 11A and 11B are schematic constitutional views of a rectangular cell.

In the practical manufacturing, a rectangular cell is fabricated in such a way as to fold a sheet having a plurality of unit cells laminated as shown in FIGS. 1A and 1B along the regions having no active material for the accommodation within a cell case as shown in FIG. 11A, connect the leads of positive and negative electrodes thereto, pour an electrolyte, and then put a cap thereon. The above procedure makes it possible to employ a larger electrode area and a thinner plate, and thus allows for the manufacturing of cells of the high capacity type capable of passing a large current flow. Also, the serialization can be easily made within one cell, resulting in a higher utilization ratio of the cell storage space.

Figure 2:
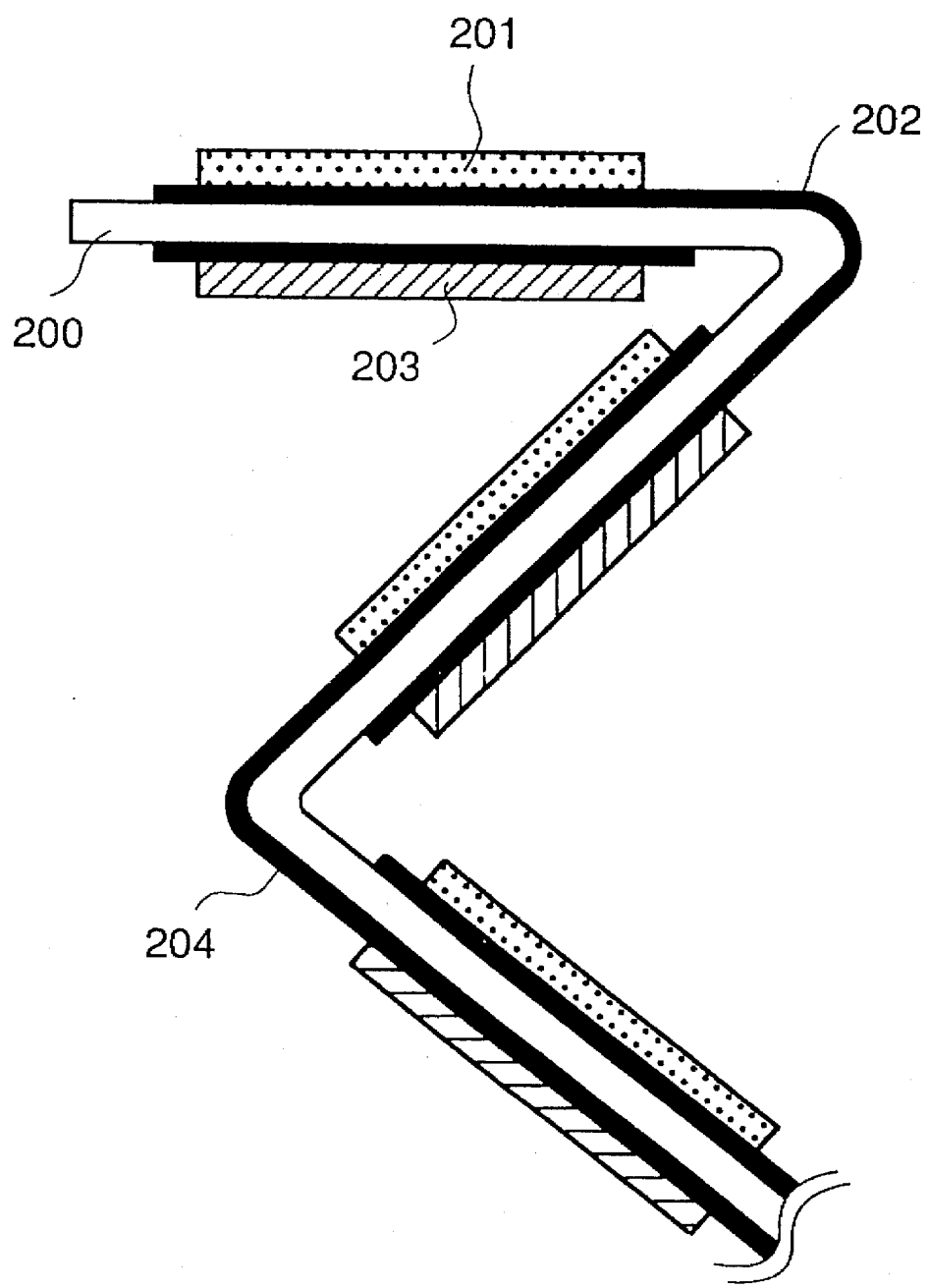
FIG. 2 is a typical view for explaining the present invention.
Figure 3:
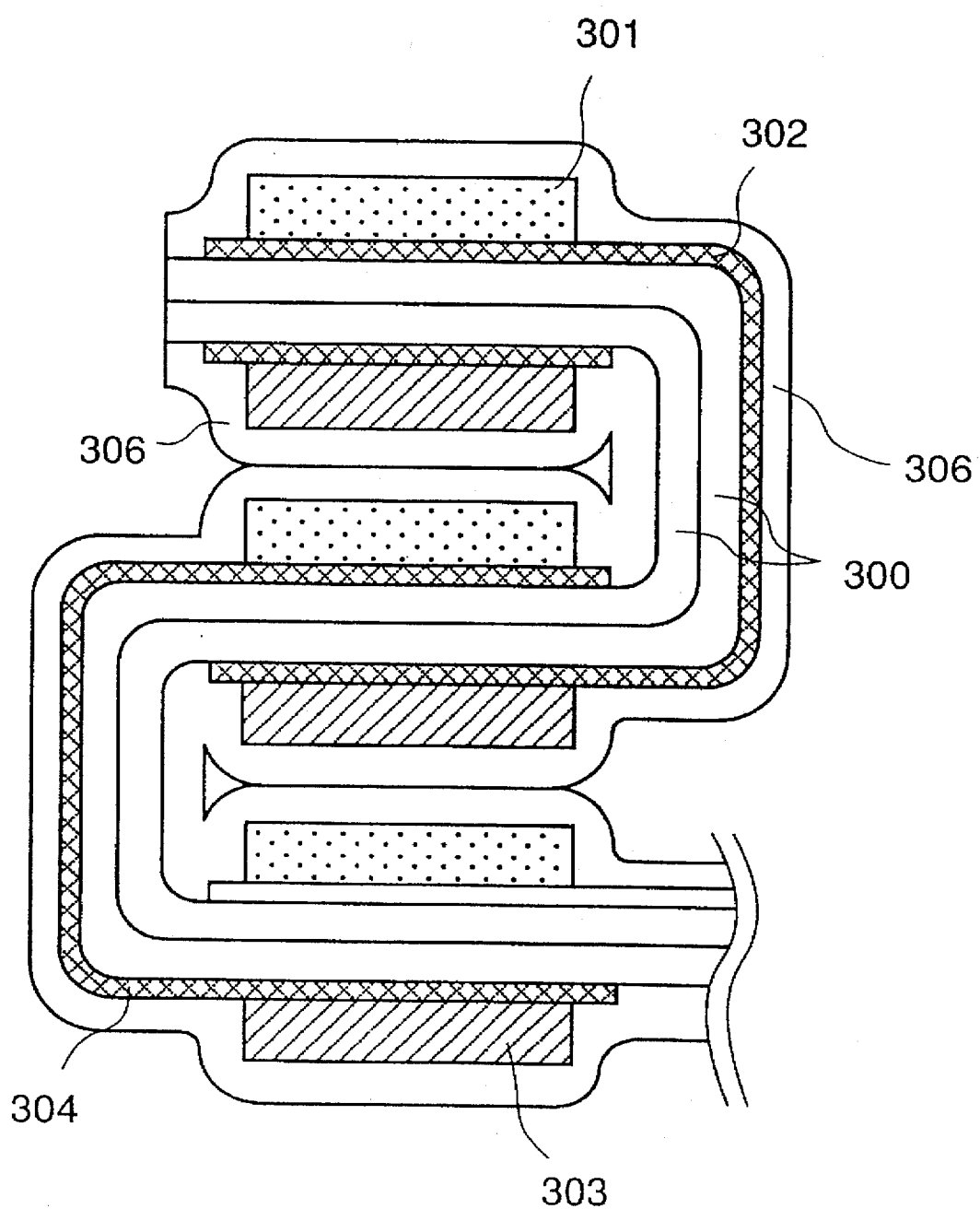
FIG. 3 is a schematic view showing a cell case of the present invention in cross section.
Figure 4:
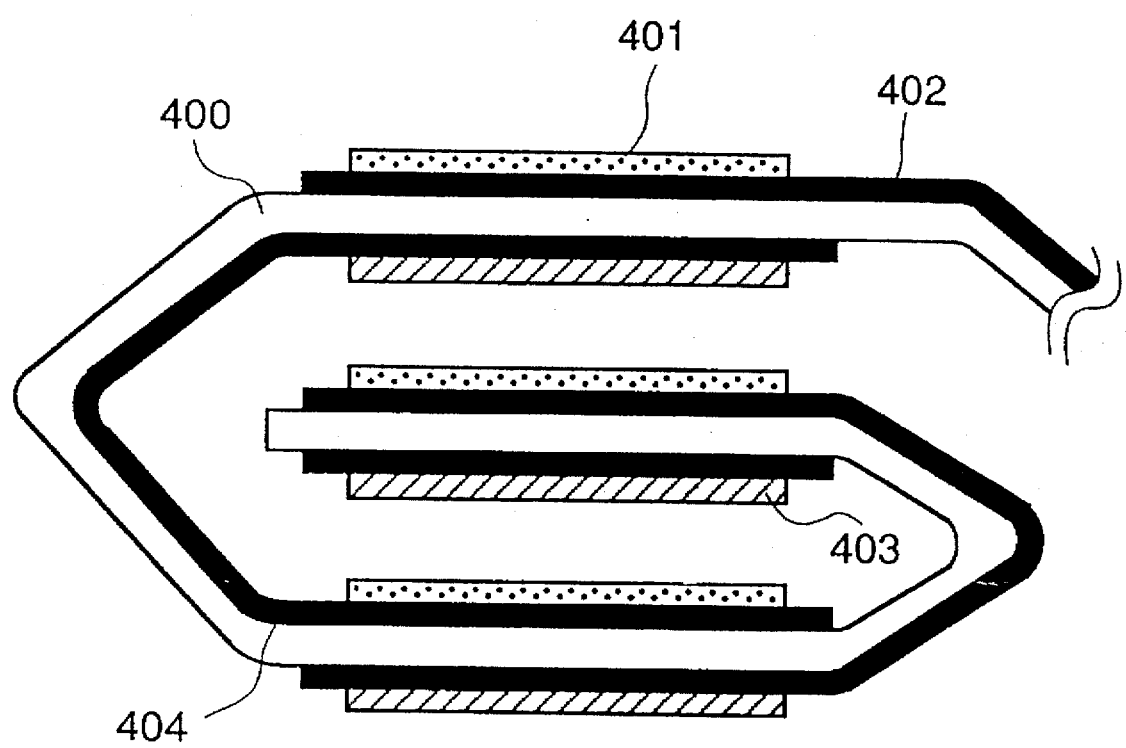
FIG. 4 is a typical view for explaining the present invention.

Examples of folding the sheet having a plurality of unit cells of FIGS. 1A and 1B laminated are shown in FIGS. 2, 3 and 4.

FIG. 2 is a typical view showing how to fold a serial connection type of unit cells as shown in FIG. 1B in a screen-like form. In FIG. 2, 200 is an insulating substrate which also serves as the separator, 201 is a positive electrode made of positive electrode active material, 203 is a negative electrode made of negative electrode active material, and 202 and 204 are collectors (no protective sheet is shown in FIG. 2).

FIG. 3 is a schematic cross-sectional view in which a pair of sheet-like insulating substrates having positive electrodes and negative electrodes formed in a plurality of regions separated from each other as shown in FIG. 1B are put together so that the positive electrode and the negative electrode as a pair may be opposed to each other, covered with a protective sheet, and folded like a screen. In practical fabrication of cells, by incorporating this folded screen into a rectangular cell case, cells having a high cell voltage and a large capacity can be made. In FIG. 3, 300 is an insulating substrate which also serves as the separator, 301 is a positive electrode made of positive electrode active material, 303 is a negative electrode made of negative electrode active material, 302 and 304 are collectors, and 306 is a protective sheet. The separator or insulating substrate as indicated at 300 contains an electrolyte therein.

FIG. 4 is a typical view showing how to fold up inwardly in a different direction from that of FIG. 2. In FIG. 4, 400 is an insulating substrate which also serves as the separator, 401 is a positive electrode made of positive electrode active material, 403 is a negative electrode made of negative electrode active material, and 402 and 404 are collectors (no protective sheet is shown in FIG. 4).

<Fabrication of positive and negative electrodes in a plurality of regions provided on the insulating member>

In a case of first providing collectors on the insulating member

In making a parallel connection of unit cells, a continuous collector as shown in FIG. 1A is used on the insulating member. In making a serial connection of unit cells, discontinuous collectors spaced at a constant interval as shown in FIG. 1B are disposed so that opposed collectors with electrodes may overlap each other when the cell is constructed. After the collectors are disposed on the insulating member as described above, positive electrodes and negative electrodes are formed in a plurality of regions separated from each other on the collectors, using active materials.

In a case of providing collectors on the positive and negative electrodes

First, using active materials, positive electrodes and negative electrodes are formed in a plurality of regions separate from each other on the collector to be provided on the insulating member. Thereafter, in connecting unit cells in parallel, a continuous collector is provided on the insulating member. In connecting unit cells in serial, discontinuous collectors spaced at a constant interval are disposed so that opposed collectors with electrodes may overlap each other, when the cell is constructed.

In a case of providing positive electrodes and negative electrodes on the same plane of the insulating member The methods of fabricating a parallel connection type of unit cells as shown in FIG. 1A or a serial connection type sheet of unit cells as shown in FIG. 1B by making a plurality of positive electrodes and negative electrodes on the same plane of the insulating member are shown in FIG. 5, FIG. 6, and FIGS. 7A and 7B.

Figure 5:
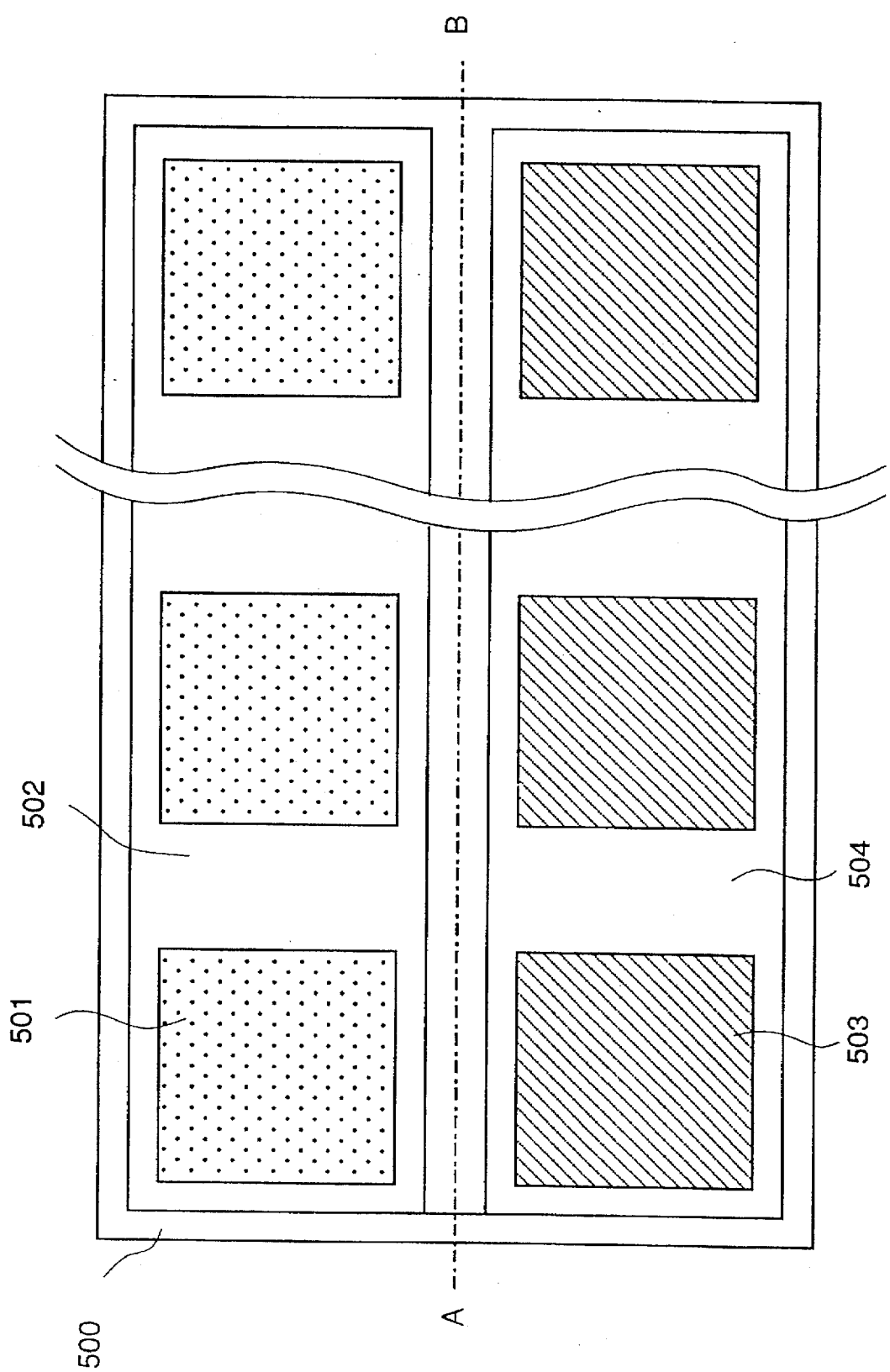
FIG. 5 is a view for explaining a procedure of fabricating a cell of the present invention.
Figure 7A:
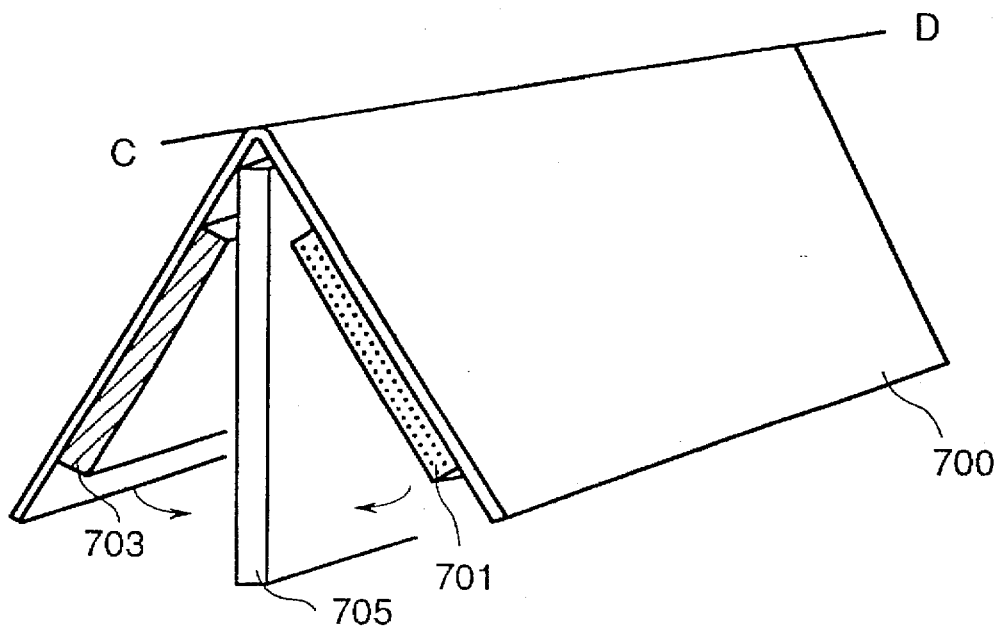
FIGS. 7A and 7B are views for explaining procedures of fabricating the cell of the present invention.
Figure 7B:
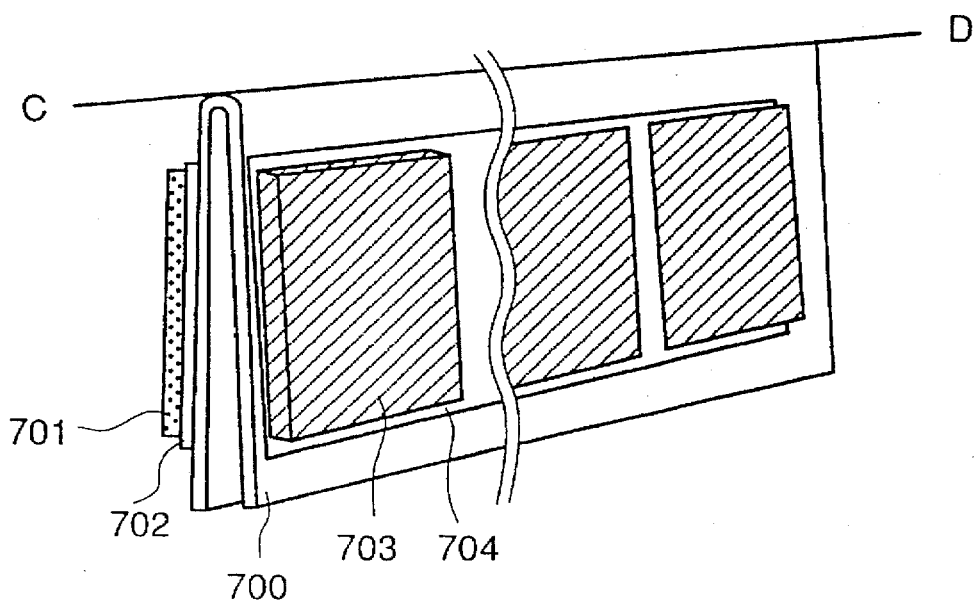

FIG. 5 is an example in which positive electrodes and negative electrodes are formed in a plurality of regions separated from each other on the same plane of the insulating substrate. In FIG. 5, 500 is an insulating substrate, 501 is a positive electrode, 503 is a negative electrode, and 502 and 504 are collectors. By folding up along the line A-B, a plurality of unit cells connected in parallel or serial can be constructed. There are two folding directions, i.e., inward and outward, which are typically shown in FIGS. 7A and 7B. In FIG. 7A, 700 is an insulating substrate, 701 is a positive electrode, 703 is a negative electrode, 702 and 704 are collectors, and 705 is a separator. In FIG. 7B, the insulating substrate as indicated by 700 can be also used as the separator.

Figure 6:
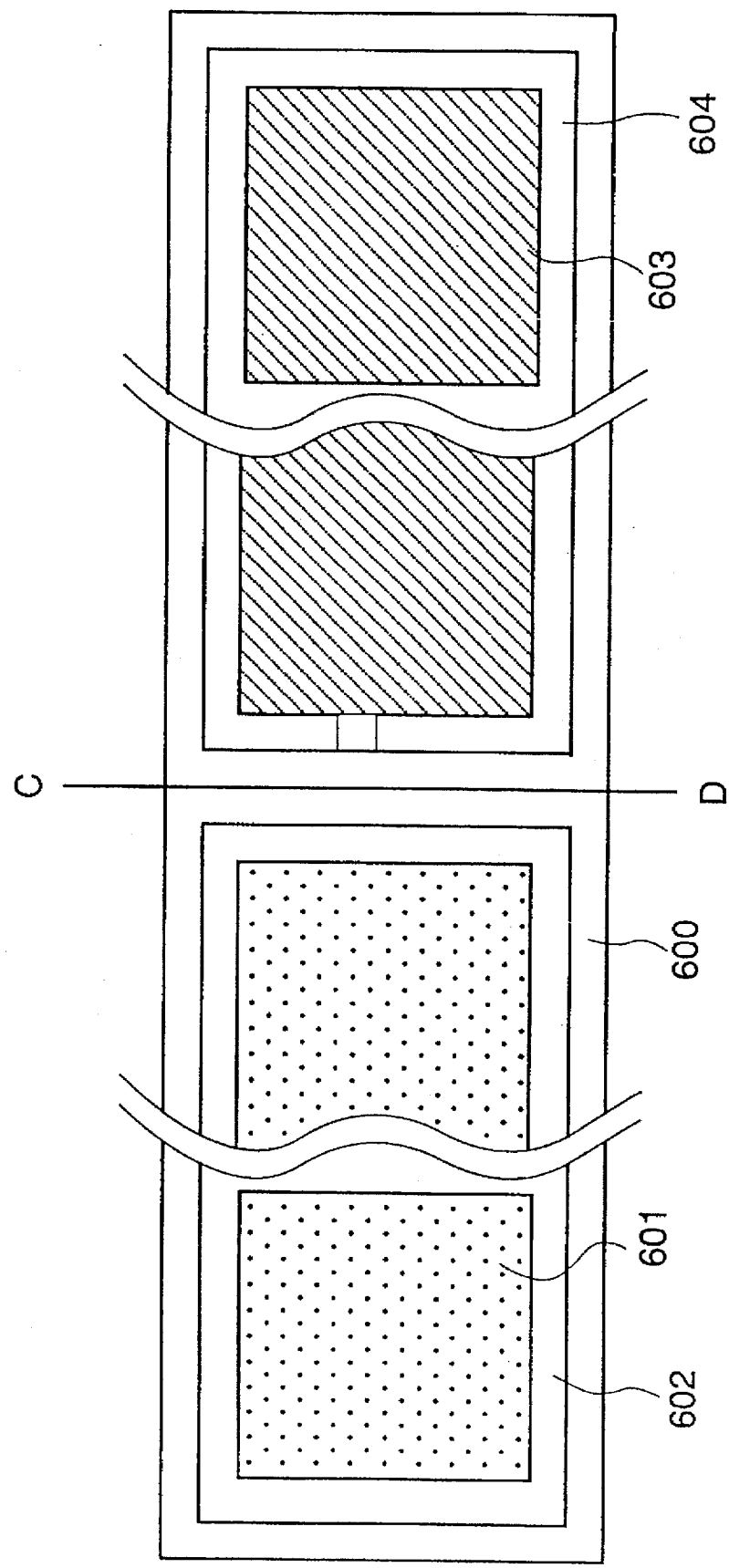
FIG. 6 is a view for explaining the procedure of fabricating the cell of the present invention.

FIG. 6 is a view in which positive electrode and negative electrode are formed in a plurality of regions separated from each other on the same insulating substrate to fabricate a parallel or serial connection type of unit cells (this example is different from that of FIG. 5). In FIG. 6, 600 is an insulating substrate, 601 is a positive electrode, 603 is a negative electrode, and 602 and 604 are collectors. By folding up along the line C-D, a plurality of unit cells connected in parallel or serial can be constructed.

By adopting the fabrication methods as described above and shown in FIG. 5, FIG. 6, and FIGS. 7A and 7B, the alignment of a positive electrode and a negative electrode constituting a unit cell can be facilitated, whereby the manufacturing process is simplified.

[Constitutive material of the cell]

Insulating member

The materials of the insulating member include glass, ceramics, and organic resins. Examples of the organic resin may include polyethylene, polypropylene, fluororesin, polyimide, polyamide, vinyl chloride, polyurethane, and polystyrene. The insulating member is folded to make the shape of a rectangular cell, and therefore required to have flexibility. When the insulating member is also used as the separator, it is desirable to have a micropore structure and the liquid retainability.

When the insulating member is folded in use, a cut line should be provided along the folding part in the insulating member to make the folding easier and suppress the stress from occurring after the accommodation within the cell case. The cut line provided in the insulating member may take any shape inasmuch as the insulating member can be readily folded.

Also, the surface of the insulator on which active material or collectors are provided is desirably subjected to corona discharge treatment, plasma treatment, treatment with coupling agent, or etching treatment in order to enhance the contactness. The source gases for the plasma for use with the plasma treatment include gases of hydrogen, oxygen, nitrogen, argon, ammonia, and hydrocarbon. The coupling agents may include a silane coupling agent, and a titanate coupling agent.

The insulating substrate may be preformed with patterns of conductive material for the collector electrode. Such collector electrode patterns of conductive material can be formed by plating, vapor deposition, or printing with conductive paste.

Collector

The materials of the collector include conductive materials such as carbon, stainless steel, titanium, nickel, copper, aluminum, platinum and gold.

The collector may be provided in a thin film or foil, and be fibrous, porous or meshy.

The ways of providing the collector include plating or depositing a conductive material on the insulating substrate or the positive and negative electrodes provided on the insulating substrate, printing a conductive paste, or ultrasonic welding or pressure connecting a fibrous, porous or meshy conductive sheet.

<Formation of positive and negative electrodes>

A mixture of an active material, a conductor powder and a binding agent is prepared to a paste having an adequate viscosity by adding a solvent as necessary, applied over a plurality of regions on the insulating substrate, dried and cured.

The application methods may include screen printing and coating by coater, spray, and electrodeposition. However, when the negative electrode active material is as soft as metal lithium and itself has a conductivity, the method is not limitative to those above cited, and the negative electrodes can be formed on the insulating substrate by pressure connection without the use of any conductor powder and binding agent.

Conductor powder

The role of conductor powder is to help the electronic conduction and facilitate the current collection when the active material involves poor conductivity. Examples of the conductor powder may include various carbon materials such as acetylene black, ketene black, and graphite powder, and metallic materials such as nickel, titanium, copper, stainless steel, and aluminum. The mixture weight ratio of conductor powder to active material is preferably 1 or less.

Binding agent

Binding agent has a role of connecting active material powders together to prevent them from falling off the collector due to cracks occurring in charging and discharging cycles, when the moldability of active material is poor. The materials of binding agent may include fluororesin, polyethylene, polypropylene, and silicone resin, which are stable in solvent when the electrolyte is non-water. The resin should be in liquid or solution, or have a lower melting point, because the content ratio of binding agent in the electrode can be lowered, and thus the cell capacity can be increased. Specific examples of the resin that is liquid or soluble in the solvent may include, in addition to polyethylene and polypropylene, fluororesin and silicone resin having ether linkage. In particular, when fluororesin having ether linkage is used, fluororesin can be dissolved in the solvent to be used at lower concentration, resulting in decreased content ratio of binding agent in the positive electrode to the minimum and raised void ratio.

An aqueous electrolyte should be subjected to hydrophilic treatment in use. When the electrolyte is an aqueous solution, other binding agents including cellulose, polyvinyl acetate, polyethylene glycol, and polyethylene oxide may be also used.

Active material

[Nonaqueous solvent type cell]

The negative electrode active materials may include lithium or lithium alloy, and sodium. Examples of lithium alloy include alloys of lithium with magnesium, aluminum, potassium, sodium, calcium, zinc, and lead. The positive electrode active materials typically may include transition metallic oxides, transition metallic sulfides, chlorine, graphite fluoride, thionyl chloride, sulfur dioxide, and sulfur. The transition metal elements for transition metallic oxides or transition metallic sulfides may be elements partially having d shell or f shell, such as Sc, Y, lanthanoid, actionoid, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Mainly, the first transition series metals including Ti, V, Cr, Mn, Fe, Co, Ni, and Cu are used.

[Aqueous solution type cell]

The negative electrode active materials may include lead, cadmium, hydrogen storage material, zinc, iron, and magnesium. The positive electrode active materials may include lead oxide, nickel hydroxide oxide, silver oxide, manganese dioxide, oxygen, bromine, chlorine, silver chloride, lead chloride, and copper chloride.

Separator

The separator has a role of preventing short-circuit between the negative electrode and the positive electrode. Also, it has a further role of holding the electrolyte. The separator has fine pores through which ions involving cell reaction can move, and is required to be insoluable and stable in the electrolyte, and may be a non-woven fabric made of glass, polypropylene, polyethylene, fluororesin, polyamide, or materials of micro-pore structure.

Electrolyte

The electrolyte may be used in a chemical state, or in a solution of electrolyte dissolved in the solvent, or by solidifying with a gelatinizer such as a polymer added to the solution. Typically, an electrolytic solution having an electrolyte dissolved in the solvent is used held on a porous separator.

It is more preferable to have a higher conductivity of electrolyte or electrolytic solution (electrolysis solution), the conductivity at 25° C. being desirably at least $1\times10^{-3}$ S/cm or more, and more preferably $5\times10^{-3}$ S/cm or more.

[Nonaqueous solvent type cell]

Examples of electrolyte may include acids such as $H_2SO_4$, HCl, and $HNO_3$, salts composed of lithium ion ($Li^+$) and Lewis acid ions ($BF_4^-$, $PF_6^-$, $AsF_6^-$, $ClO_4^-$), and blended salts thereof. In addition to the above-cited support electrolytes, salts of Lewis acid ion with cations such as sodium ion, potassium ion, and tetraalkylammonium ion may be used. The above-cited salts are desirably subjected to sufficient dehydration and deoxidation by heating under low pressure.

Examples of the solvent for the electrolyte may include acetonitrile, benzonitrile, propylene carbonate, ethylene carbonate, dimethylformamide, tetrahydrofuran, nitrobenzene, dichloroethane, diethoxyethane, chlorobenzene, γ-butyrolactone, dioxolane, sulfolane, nitromethane, dimethylsulfide, dimethylsulfoxide, dimethoxyethane, methylformate, 3-methyl-2-oxazolidinone, 2-methyltetrahydrofuran, sulfur dioxide, phosphoryl chloride, thionyl chloride, sulfuryl chloride, and mixture liquids thereof.

The above-cited solvents may be dehydrated by activated alumina, molecular sieve, phosphorus pentoxide, or calcium chloride, or distilled with alkaline metal in inert gas to remove impurities and effect dehydration, depending on the solvent.

In order to avoid the leakage of electrolysis solution, it is preferable to make gelatinization. The gelatinizer may be desirably a polymer which absorbs the solvent of electrolysis solution and swells, examples of which include polymers such as polyethylene oxide, polyvinyl alcohol, and polyacrylamide.

[Aqueous solution type cell]

The electrolyte may be sulfuric acid in the case of a lead cell, or potassium hydroxide, sodium hydroxide, lithium hydroxide, ammonium hydroxide, or a salt of alkali and zinc bromide in the case of an alkaline cell.

In order to avoid the leakage of electrolysis solution, it is preferable to make gelatinization. The gelatinizer may be desirably a polymer which absorbs the solvent of electrolysis solution and swells, examples of which include polymers such as polyethylene oxide, polyvinyl alcohol, and polyacrylamide, and starch.

<Covering of negative electrode and positive electrode>

In the case of cells where the negative electrode active material is lithium or zinc, there may occur dendrites causing short-circuit when charged, and to avoid this occurrence, the surface of negative electrode or positive electrode, or both surfaces should be covered with a film through which ions involving the cell reaction can penetrate so as to elongate the cycle life of the cell.

Examples of the covering material may include a large ring compound derivative polymer, aromatic hydrocarbon derivative polymer, fluororesin, silicone resin, titanium resin, polyolefine, or inorganic oxide, nitride, carbide, and halide. The covering of the positive electrode with a large ring compound derivative polymer, aromatic hydrocarbon derivative polymer, or fluororesin is especially effective for lithium secondary cells.

Cell case

The cell case may be an outer packaging can made of a metallic material which is also used as the output terminal, or a resin material case made of plastic.

The materials for the outer packaging can or cap include stainless steel, especially, titanium clad stainless and copper clad stainless, zinc, and nickel plated steel sheet.

The materials for the plastic case may include plastics such as polypropylene and polyethylene, and composites of plastics with metal or glass fiber.

Insulating packing

The materials for the insulating packing may include fluororesin, polyamide resin, polysulfone resin, and various rubbers.

Sealing opening

The way of sealing the opening may include, in addition to caulking using a gasket such as an insulating packing, the use of adhesives, welding and soldering.

Insulating plate

The materials of the insulating plate for the insulation and isolation within the cell may include various organic resin materials, and ceramics.

Safety valve

The safety measure against the elevated internal pressure within the cell involves the use of a safety valve comprised of a rubber, a spring, or a metallic ball.

<Fabricating the cell>

The cell is fabricated in such a way that active materials and an electrolyte are selected in accordance with a cell to be fabricated, such as lithium cell, nickel cadmium cell, nickel hydrogen storage material cell, nickel zinc cell, lead cell, and air cell; a sheet of the parallel type or serial type consisting of a plurality of unit cells is made by the previously-described method, with a separator and a protective sheet interposed, folded up as appropriate in conformity with the cell case, and housed within the cell case; the positive electrode and the negative electrode are connected to the cell terminal; the electrolyte is poured therein; and the sealing is made.

[EXAMPLES]

The present invention will be described in detail in connection with the examples. Note that the present invention is not limited to those examples.

(Example 1)

A rectangular lithium cell having a plurality of unit cells connected in parallel within a cell was fabricated in an argon gas in accordance with the following procedure.

First, after the scored cut line was entered at the folding part of polypropylene non-woven fabric, the surface was subjected to corona discharge treatment. A positive electrode active material was prepared by mixing acetylene black, nickel super fine powder, Lumifron (fluororesin, manufactured by Asahi Glass) into manganese dioxide, adding xylene, and adjusting the viscosity.

A positive electrode active material paste prepared was printed in a plurality of regions for the formation of positive electrodes on the polypropylene non-woven fabric subjected to the surface treatment by a screen printing apparatus, on which a nickel meshed collector sheet with the lead was disposed, and dried. Then, a plurality of lithium foils cut into a size of unit negative electrode was pressure connected with the nickel meshed collector sheet with the lead, covered with a Lumifron thin film manufactured by Asahi Glass, and disposed on negative electrode forming regions on the polypropylene nonwoven fabric printed with the positive electrodes. Then, a protective sheet made of polypropylene film was superposed on the polypropylene non-woven fabric provided with the positive and negative electrodes and the collectors, the entirety of which was pressure connected by a roll press machine with the film thickness adjusted, whereby a sheet with patterns having a plurality of positive electrodes and negative electrodes arranged as shown in FIG. 6 was made after the heat treatment at 100° C. This sheet was cut into unit sheets as shown in FIG. 6. In FIG. 6, 600 is a polypropylene non-woven fabric, 601 is a positive electrode composed of positive electrode active material, 603 is a lithium negative electrode, and 602 and 604 are nickel collectors.

The sheet was folded along the C-D line between patterns of positive electrode and negative electrode in a unit sheet of FIG. 6 obtained, as shown in FIG. 7B, into which a polypropylene film of micropore structure was interposed, and further folded up like a screen, as shown in FIG. 2, whereby a parallel connection type of unit cells was fabricated as shown in FIG. 3. Then, this rectangular cell was housed in a cell case made of titanium clad stainless, as shown in FIG. 11A, with the lead parts of collector for the positive electrode and negative electrode being connected to the cell terminals, an electrolyte prepared by dissolving 1M (mol/l) of lithium borate tetrafluoride salt in an equivalent weight mixture solvent of propylene carbonate and dimethoxyethane was poured thereinto, an insulating packing and a cap made of titanium clad stainless were put thereon and caulked, whereby a rectangular cell having a size of 14 millimeters×14 millimeters×49.5 millimeters was fabricated.

The rectangular cell fabricated was discharged for ten hours to calculate the capacity, resulting in an increased capacity of 40% as compared with the cylindrical cell of U-3 (AA) size. Also, since the thickness of positive electrode and negative electrode could be made thinner, and the area could be increased, the flow of a large current could be easily passed, like a spirally wound cylindrical cell. Also, the manufacturing process could be facilitated as compared with that of the conventional rectangular cell.

(Example 2)

An integrated sheet-type lithium cell having two pairs of unit cells connected in serial within a cell was fabricated in an argon gas atmosphere in accordance with the following procedure.

Figure 8:
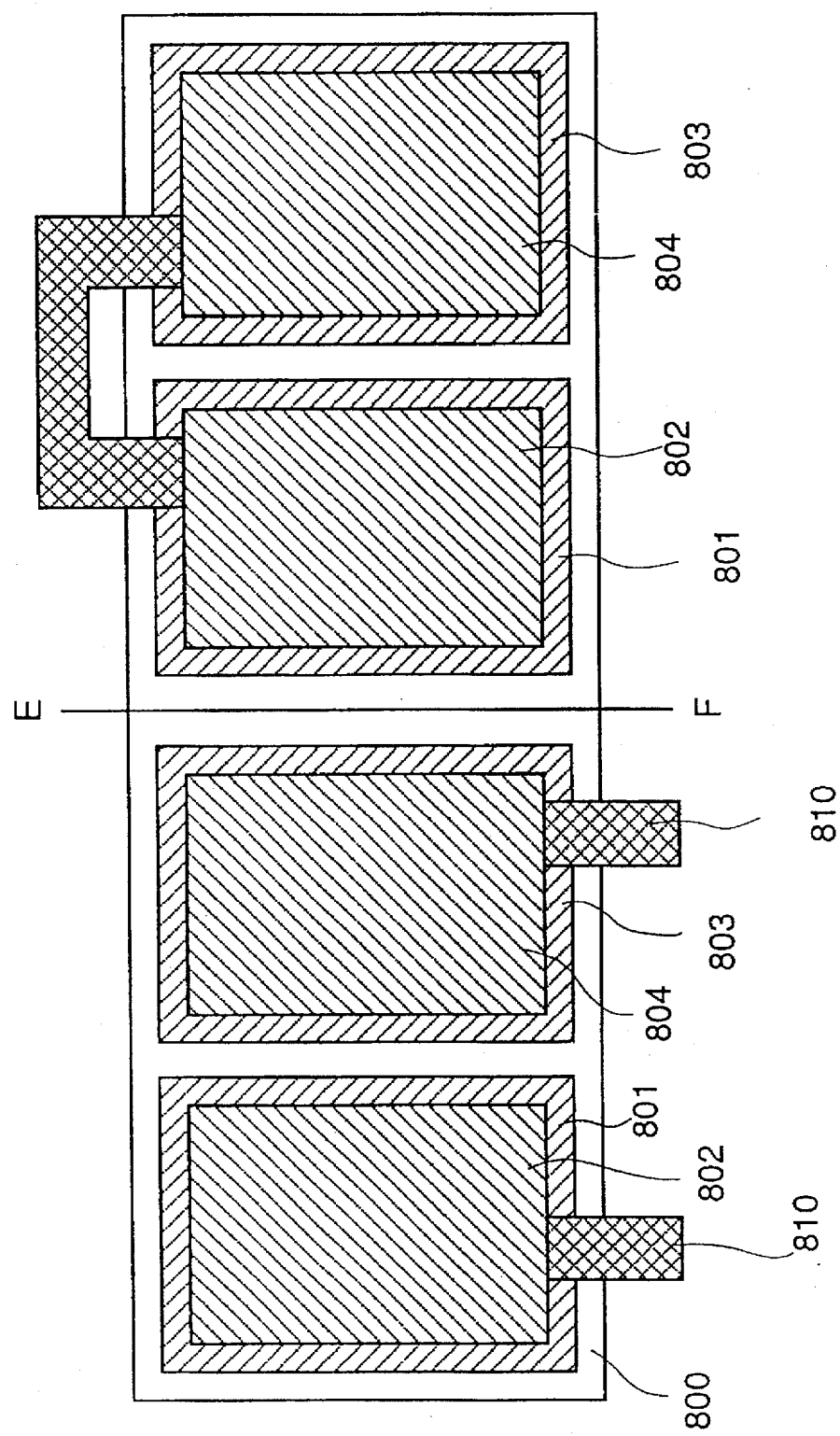
FIG. 8 is a typical view for explaining a sheet-like cell of the present invention and its fabrication procedure.
Figure 9A:
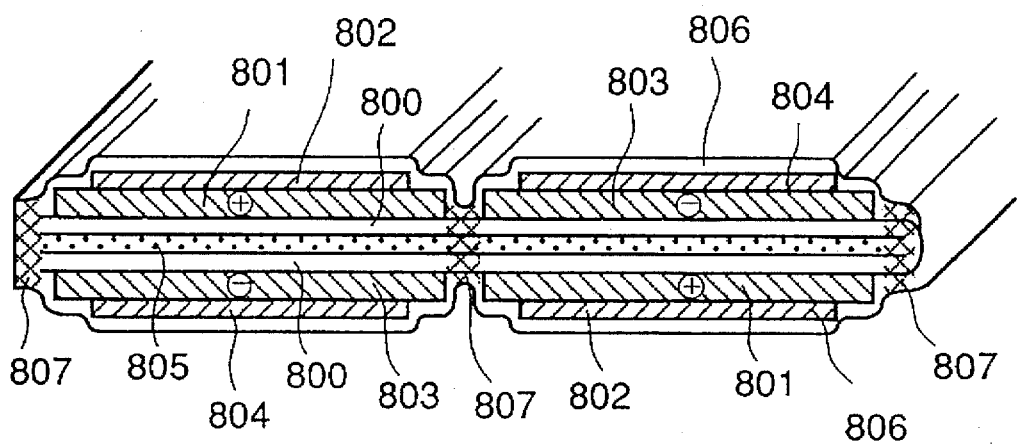
FIGS. 9A and 9B are typical views for explaining a sheet-like cell of the present invention and its fabrication procedure.
Figure 9B:
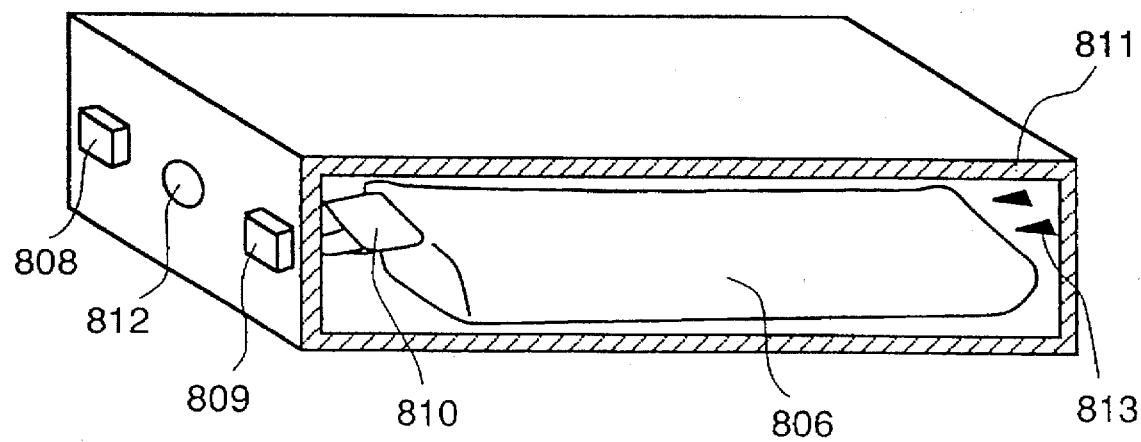
Figure 10:
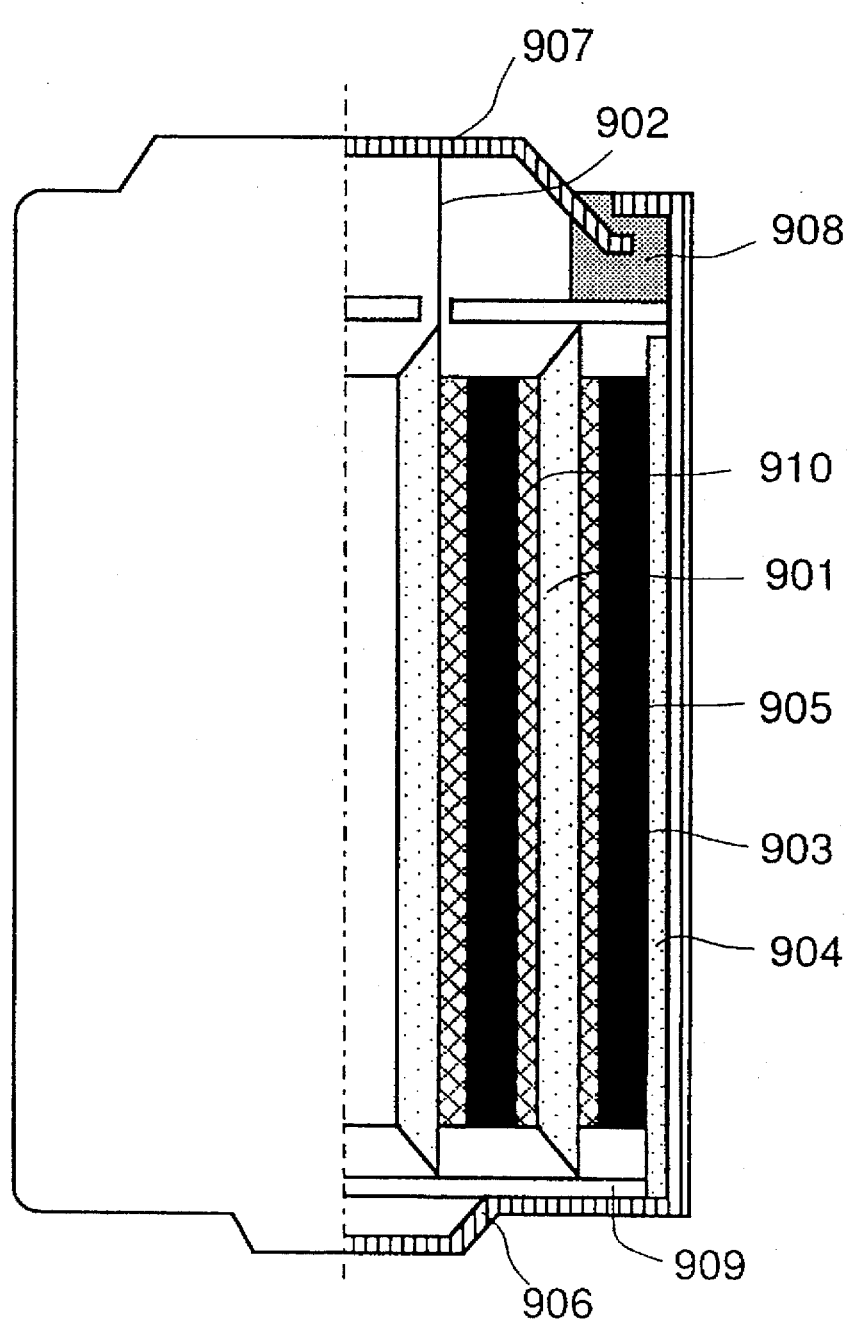
FIG. 10 is a cross-sectional view of a spirally wound cylindrical cell.

In FIG. 8, a manganese dioxide paste prepared in the same way as in the embodiment 1 was printed by screen printing on positive electrode forming regions 801 on a polypropylene film 800 having a micropore structure subjected to corona discharge treatment. Then, nickel mesh collectors 802 with nickel foil leads were laid thereon, and lithium foils having nickel mesh collectors 804 pressure connected were laid on negative electrode forming regions 803 on the propylene film and dried. Then, it was sandwiched between an aluminum laminate film having an aluminum foil laminated with a resin film, and a separator of polypropylene non-woven fabric, and then passed through a heating roll for the pressure connection. An electrolysis solution equivalent to that of the example 1 was penetrated into the separator at each of the positive electrodes and negative electrodes, folded at the E-F line to fuse together the aluminum laminate film, the polypropylene film, and the separator around the positive electrodes and the negative electrodes, as shown in FIGS. 9A and 9B. FIG. 9A is a cross-sectional view of a cell obtained by lamination. In FIGS. 8 and 9A and 9B, 800 is a polypropylene film, 801 is a positive electrode, 803 is a negative electrode, 802 and 804 are collectors, 805 is a separator, 806 is an aluminum laminate film, and 807 is a fusing part. The above-mentioned fusing process is to separate adjacent unit cells at the fusing part 807. Without this separation, an electromotive force may occur between adjacent positive and negative electrodes, despite the serialization within the cell, so that twice the voltage of the unit cell can not be attained.

Next, the leads of aluminum laminate cell obtained were connected to the positive electrode terminal and the negative electrode terminal, and enclosed within the cell case of polypropylene resin, whereby a 3 mm-thick sheet-type lithium cell was fabricated. FIG. 9B is a schematic constitutional view of a cell constituted from the laminate cell. In FIG. 9B, 806 is an aluminum laminate film, 808 is a positive electrode terminal, 809 is a negative electrode terminal, 810 is a lead, 811 is a cell case, 812 is a safety valve, and 813 is a pin for exhausting the laminate cell to lower pressure by opening a hole when the internal pressure of the laminate cell is raised.

The cell voltage of the sheet-type lithium cell obtained reached an output of 6 volts with the single cell.

(Example 3)

In the same way as with the example 1, a rectangular nickel hydrogen storage material cell having a plurality of unit cells connected in parallel within the cell was fabricated in the following procedure.

First, after the scored cut line was entered at the folding part of polyamide non-woven fabric, the surface was subjected to corona discharge treatment. A negative electrode active material paste was prepared by mixing foliate graphite, nickel super fine powder, polyethylene powder, and polyvinyl alcohol powder into Mm (misch metal)-Ni—Ti—Zr—Mn—V—Co alloy powder, and adding tetrahydrofuran thereto, with the viscosity adjusted. A positive electrode active material paste was prepared by mixing nickel powder, cobalt monoxide, foliate graphite, polyethylene powder, and polyvinyl alcohol powder, in various shapes such as flake, spheroidal, and spicular shapes, into nickel hydroxide, and adding tetrahydrofuran thereto, with the viscosity adjusted.

Positive electrode active material paste and negative electrode active material paste as above prepared were printed on a plurality of positive and negative electrode forming regions on the polyamide non-woven fabric subjected to the surface treatment by a screen printing apparatus, on which nickel meshed collector sheets with the leads were disposed, and dried. Then, a protective sheet made of polyester film was superposed on the polyamide non-woven fabric provided with the positive and negative electrodes and the collectors, and pressure connected by a roll press machine, with the film thickness adjusted, whereby a sheet with a plurality of patterns arranged as shown in FIG. 6 was made through the heat treatment at 100° C. This sheet was cut into unit sheets as shown in FIG. 6.

The sheet was folded along the C-D line between patterns of positive electrodes and negative electrodes in a unit sheet of FIG. 6 obtained, as shown in FIG. 7B, into which a polypropylene film of micropore structure subjected to hydrophilicity treatment was interposed, and further folded like a screen as shown in FIG. 2, whereby a parallel connection type of unit cells was fabricated as shown in FIG. 3. Then, the rectangular cell was housed within a cell case made of titanium clad stainless, with the lead parts of the collector for the positive electrode and negative electrode being connected to the cell terminals, an electrolyte prepared by dissolving 6M (mol/l) potassium hydroxide solution having lithium hydroxide added was poured thereinto, and an insulating packing and a cap made of titanium clad stainless were put thereon and caulked, whereby the rectangular cell in a size of 14.5 millimeters×7.5 millimeters× 48.4 millimeters was fabricated.

Figure 11B:
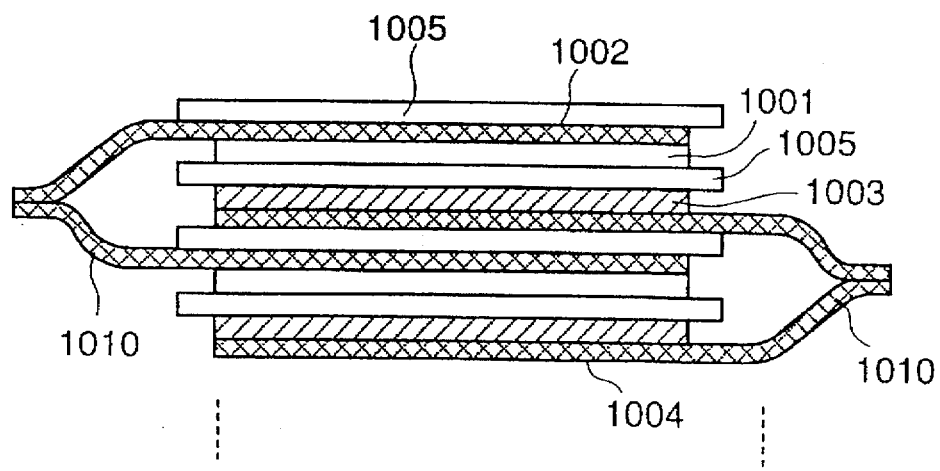

The rectangular cell thus fabricated was discharged for ten hours to calculate the capacity, resulting in an increased capacity of 40% as compared with the lamination-type cell as shown in FIG. 11B.

(Example 4)

A nickel cadmium cell was fabricated substantially in accordance with the same procedure as the example 3.

A rectangular nickel cadmium cell having a size of 23 millimeters×14.7 millimeters×67 millimeters was fabricated in the same way as in the example 3, except that a negative electrode active material paste was prepared using cadmium oxide powder, instead of hydrogen storage material powder as the negative electrode active material in the example 3.

The rectangular cell thus fabricated was discharged for ten hours to calculate the capacity, resulting in an increased capacity of 15% as compared with the lamination-type cell as shown in FIG. 11B.

As described above, from the examples 1, 3 and 4, it has been found that by adopting a cell structure of the present invention, the cell having a higher capacity can be fabricated than the cylindrical cell and the rectangular cell of lamination structure. Further, from the example 2, it has been also found that by integrating unit cells within the cell, the cell having a still higher cell voltage can be easily fabricated.

With the present invention, in the rectangular or sheet-type cell, it is possible to attain an energy density equivalent to that of the cylindrical cell of spiral structure, and pass the flow of a large current, with the dead space of the cell storage space reduced to the utmost. Further, since the integration can be effected even with a single cell, it is possible to attain a higher cell voltage. Also, the manufacturing process of the rectangular cell can be simplified.

What is claimed is:

1. A method for producing a battery comprising the steps of:

forming, on an organic polymer sheet insulating member, a positive pole region having a positive electrode active material and a negative pole region having negative electrode active material separately from each other;

arranging the positive pole region and the negative pole region to oppose each other;

fusing the sheet insulating member at blank sections where the positive pole region and the negative pole region are not provided to form unit cells; and arranging the unit cells into a housing.

2. A method according to claim 1, further comprising the step of bending the insulating member at least one of the blank sections.

3. A method according to claim 1, further comprising the steps of:

arranging the positive pole region and the negative pole region to oppose each other and sandwich therebetween the sheet insulating member and a separator; and fusing the blank sections together with the sheet insulating member and the separator.

4. A method according to claim 1, further comprising the step of forming the positive pole region and the negative pole region on one side of the organic polymer sheet, wherein the sheet is bent along at least one line of the blank section and said positive pole region and said negative pole region are arranged to oppose each other and sandwich the sheet insulating member.

5. A method according to claim 1, further comprising the step of forming the positive pole region and the negative pole region on one side of the organic polymer sheet and providing a separator at a predetermined region on the other side of the organic polymer sheet, wherein the sheet is bent along at least one line of the blank sections and the positive pole region and the negative pole region are arranged to oppose each other and sandwich therebetween the sheet insulating member and the separator.

6. A method according to claim 1, further comprising the steps of:

forming the positive pole region and the negative pole region on one side of the organic polymer sheet;

pressing a laminate film to contact the positive and negative pole regions on the one side; and pressing a separator to contact at least a predetermined region of the other side of the organic polymer sheet, wherein the sheet is bent along at least one line of the blank sections of said sheet, and the positive pole region and said negative pole region are arranged to oppose each other and sandwich the sheet insulating member and the separator, with the sheet insulating member being fused at the blank section together with the separator and the laminate film.

* * * * *

UNITED STATES PATENT AND TRADEMARK OFFICE
CERTIFICATE OF CORRECTION

PATENT NO. : 5,693,105                              Page 1 of 9
DATED      : December 2, 1997
INVENTOR(S): Kawakami It is certified that error appears in the above-identified patent and that said Letters Patent is hereby corrected as shown below:

SHEET 2 OF DRAWINGS:

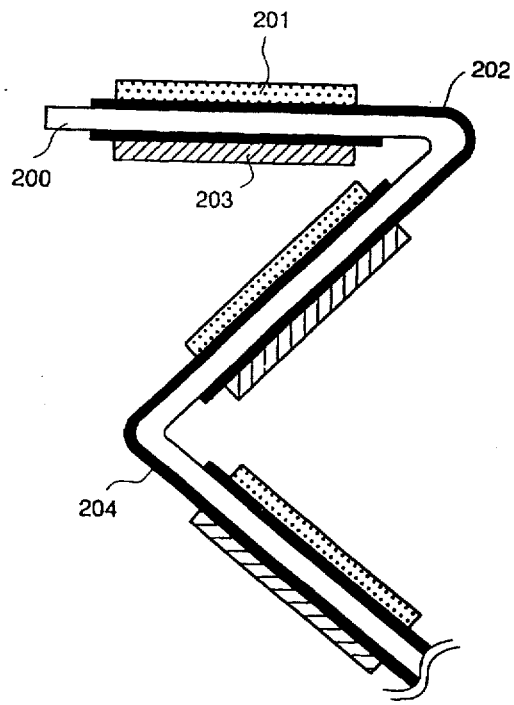

FIG. 2

UNITED STATES PATENT AND TRADEMARK OFFICE
CERTIFICATE OF CORRECTION

PATENT NO. : 5,693,105
DATED : December 2, 1997
INVENTOR(S) : Kawakami

It is certified that error appears in the above-identified patent and that said Letters Patent is hereby corrected as shown below:

SHEET 2 OF DRAWINGS (continued):

should read

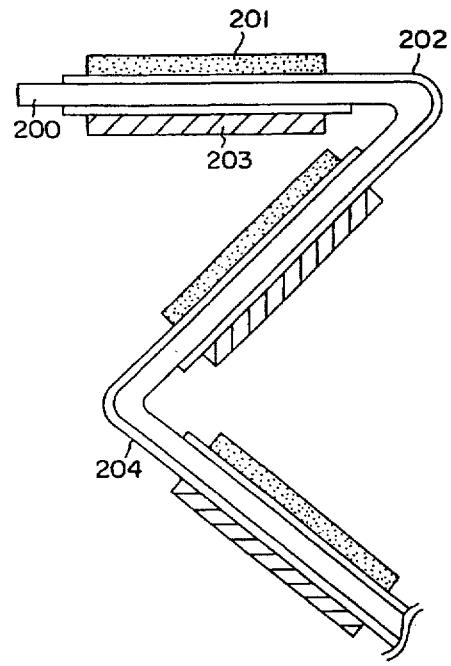

FIG.2A

UNITED STATES PATENT AND TRADEMARK OFFICE
CERTIFICATE OF CORRECTION

PATENT NO. : 5,693,105        Page 3 of 9
DATED : December 2, 1997
INVENTOR(S) : Kawakami It is certified that error appears in the above-identified patent and that said Letters Patent is hereby corrected as shown below:

SHEET 2 OF DRAWINGS (continued):

should read

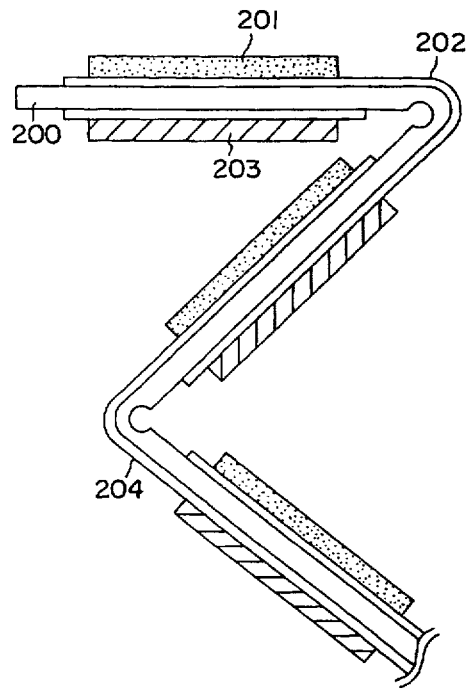

FIG.2B

UNITED STATES PATENT AND TRADEMARK OFFICE
CERTIFICATE OF CORRECTION

PATENT NO. : 5,693,105  Page 4 of 9
DATED : December 2, 1997
INVENTOR(S) : Kawakami It is certified that error appears in the above-identified patent and that said Letters Patent is hereby corrected as shown below:

SHEET 4 OF DRAWINGS:

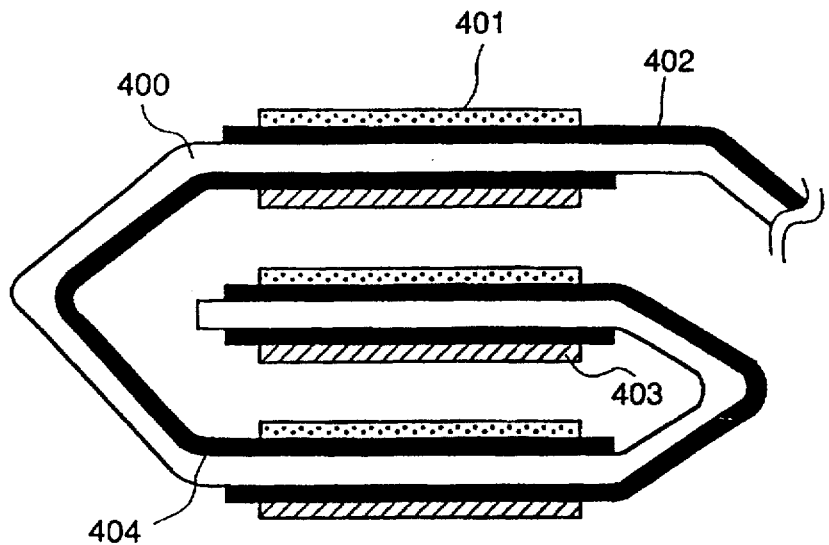

FIG. 4

UNITED STATES PATENT AND TRADEMARK OFFICE
CERTIFICATE OF CORRECTION

PATENT NO. : 5,693,105
DATED : December 2, 1997
INVENTOR(S) : Kawakami

It is certified that error appears in the above-identified patent and that said Letters Patent is hereby corrected as shown below:

SHEET 4 OF DRAWINGS (continued):

should read

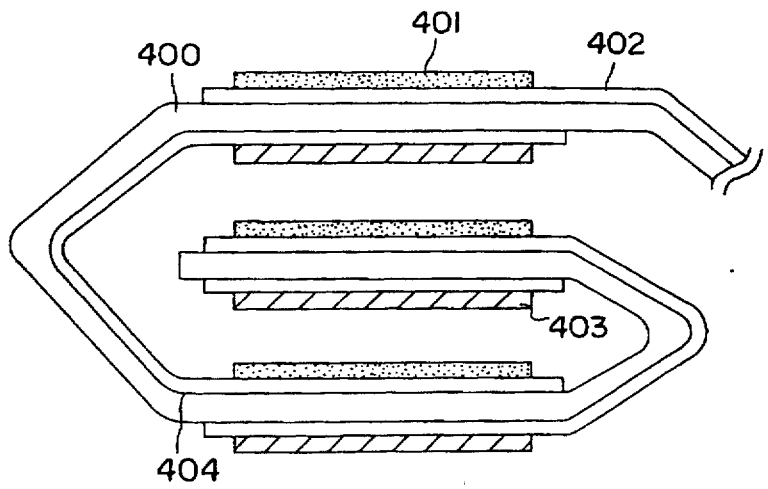

FIG.4

UNITED STATES PATENT AND TRADEMARK OFFICE
CERTIFICATE OF CORRECTION

PATENT NO. : 5,693,105      Page 6 of 9
DATED : December 2, 1997
INVENTOR(S) : Kawakami It is certified that error appears in the above-identified patent and that said Letters Patent is hereby corrected as shown below:

SHEET 10 OF DRAWINGS:

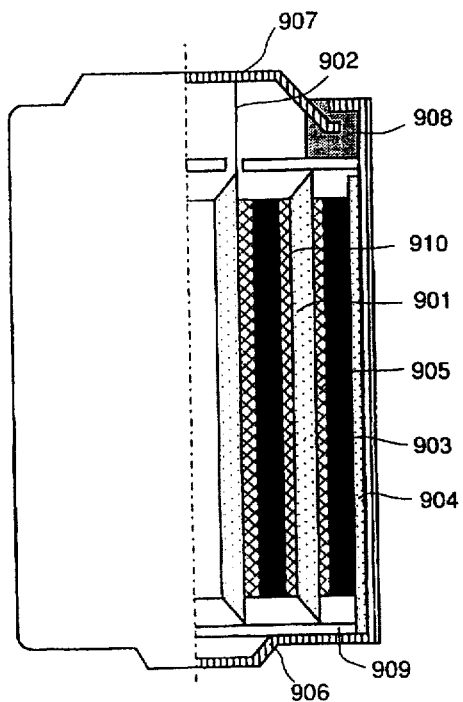

FIG.10
PRIOR ART

UNITED STATES PATENT AND TRADEMARK OFFICE
CERTIFICATE OF CORRECTION

PATENT NO. : 5,693,105  
DATED : December 2, 1997  
INVENTOR(S) : Kawakami

Page 7 of 9

It is certified that error appears in the above-identified patent and that said Letters Patent is hereby corrected as shown below:

SHEET 10 OF DRAWINGS (continued):

should read

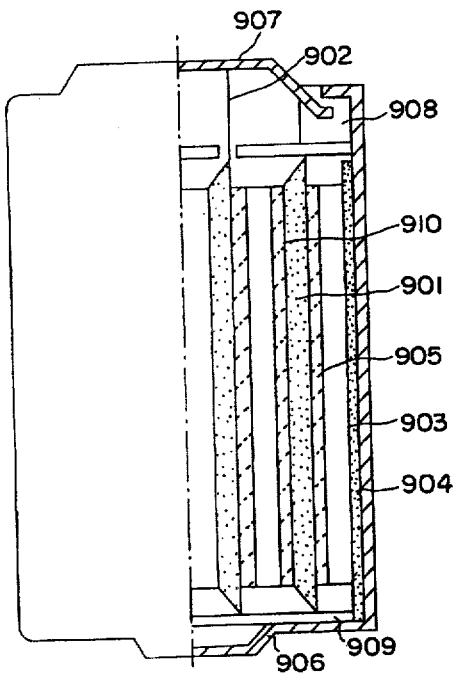

FIG. 10
PRIOR ART

UNITED STATES PATENT AND TRADEMARK OFFICE
CERTIFICATE OF CORRECTION

PATENT NO. : 5,693,105
DATED : December 2, 1997
INVENTOR(S) : Kawakami

It is certified that error appears in the above-identified patent and that said Letters Patent is hereby corrected as shown below:

[57] ABSTRACT:

Line 10, "housed" should read --housed by--.

COLUMN 2:

Line 50, "FIG. 2 is a typical view" should read --FIGS. 2A and 2B are typical views--.

COLUMN 3:

Line 52, "FIGS. 2," should read --FIGS. 2A and 2B,--.
Lines 54, 56 and 61, "FIG. 2" should read --FIGS. 2A and 2B--.
Line 54, "is a typical view" should read --are typical views--.

COLUMN 4:

Line 21, "member" should read --member:--.
Line 33, "electrodes" should read --electrodes:--.
Line 44, "member" should read --member:--.

UNITED STATES PATENT AND TRADEMARK OFFICE
CERTIFICATE OF CORRECTION

PATENT NO. : 5,693,105
DATED : December 2, 1997
INVENTOR(S) : Kawakami

It is certified that error appears in the above-identified patent and that said Letters Patent is hereby corrected as shown below:

COLUMN 9:

Line 15, "electrode" (both occurrences) should read --electrodes--.

COLUMN 12:

Line 8, "at" should read --at at--.

Signed and Sealed this

Twentieth Day of October, 1998

*Attest:*

BRUCE LEHMAN

*Attesting Officer*     *Commissioner of Patents and Trademarks*